G. W. KENNEDY.
CREAM OR MILK AERATOR.
APPLICATION FILED SEPT. 29, 1919.

1,344,902.

Patented June 29, 1920.

Inventor,
G. W. Kennedy, by
G. C. Kennedy,
Attorney.

UNITED STATES PATENT OFFICE.

GEORGE W. KENNEDY, OF WATERLOO, IOWA.

CREAM AND MILK AERATOR.

1,344,902.   Specification of Letters Patent.   Patented June 29, 1920.

Application filed September 29, 1919. Serial No. 327,145.

*To all whom it may concern:*

Be it known that I, GEORGE W. KENNEDY, a citizen of the United States of America, and a resident of Waterloo, Blackhawk county, Iowa, have invented certain new and useful Improvements in Cream or Milk Aerators, of which the following is a specification.

My invention relates to improvements in cream or milk aerators, and the object of my improvement is to supply apparatus for aerating cream or milk, and to improve the device of my Patent No. 765,778, of July 26, 1904, by first, adopting a superior form for the dasher and associated elements nested together, for cheapness in manufacture and adapted to be more easily cleansed; and second, by associating movable linking-connections with the water-tank and milk or cream container, to permit limited movements of the container in one direction, without interference or any obstruction to the operation.

Figure 1:
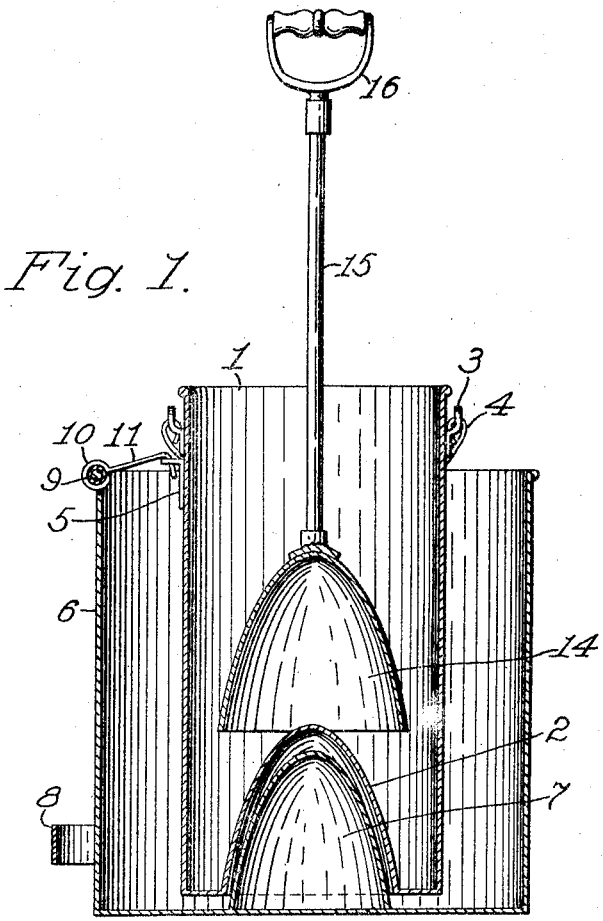
Figure 2:
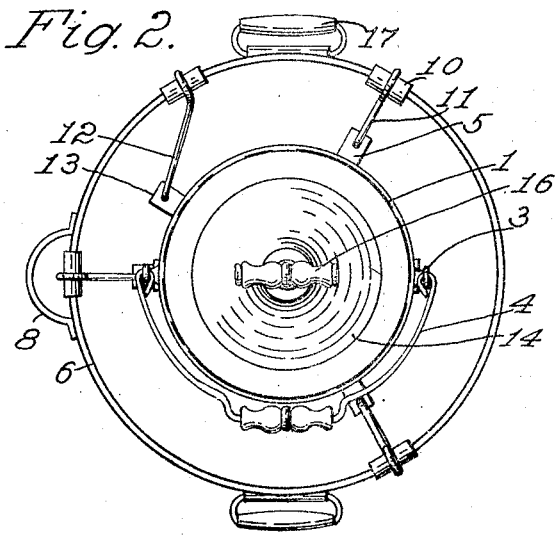

The above objects I have accomplished by the means which are hereinafter described and claimed, and which are illustrated in the accompanying drawings, in which Figure 1 is a vertical central section of my improved apparatus for aerating cream or milk, and Fig. 2 is a top plan view of the same.

Similar numerals of reference denote corresponding parts throughout the several views.

The numeral 6 denotes a relatively large open top can or tank to contain water for cooling the contents being aerated in a smaller can 1 positioned therein. The inner can 1 is also open at the top and has a pair of oppositely placed ears 3 to receive the bail 4. Three equi-distantly spaced openings are positioned in the outer tank 6 just below the upper rim or roll thereof. The numeral 9 denotes a short tubular sleeve fitted on the edge roll of said tank abutting upon the opening mentioned. Hooks 11 have their eyeleted ends 10 mounted on the sleeves 9 and hook into orifice brackets 5 on the outside of the inner can 1, the hooks 11 being radial with said cans.

The numeral 12 denotes another hook whose eyeleted end is similarly mounted on the tank 6, but the hook is bent obliquely to be tangential to the can 1 and engage an orifice bracket 13 on said can to prevent movements of the can 1 within the tank 6 of a horizontally rocking nature. The first-mentioned hooks 11 permit limited vertical reciprocatory movements to the can 1.

The numeral 7 denotes a central upwardly projecting hollow boss fixed on the bottom of the tank 6 and extending into and fitting a like hollow boss 2 formed on the bottom of the can 1.

The numeral 14 denotes an open bottom hollow dasher mounted on the lower end of a stem 15 provided with a handle 16. This dasher 14 is of similar shape to the bosses 2 and 7, and when in its lowermost position, conforms to and fits the outer surface of the boss 2. It will be observed that the dasher 14 and the bosses 2 and 7 are of the same shape, that of curvilinear cones whereby the surfaces thereof are smooth and free from angles or places in which anything could collect during the operation of the device which might be cleaned out with difficulty afterward. These parts, also, may be easily and cheaply formed by being pressed out by suitable mechanism.

The tank 6 is provided with oppositely placed hinged handles 17 near its top, and with a fixed spaced handle 8 near its bottom on one side equidistant between said handles 17, the several handles being useful in transporting the water containing tank and in emptying it.

When the space between the tank 6 and can 1 is filled with cold water, and milk or cream placed in the can 1, by means of the handle 16 the dasher 14 is forced down to the bottom of the can 1. When the dasher begins to pass down over the boss 2, the air in the dasher will escape around its lower edge and passing upward through the milk or cream as a multitude of bubbles will aerate and cool the same, also while in transit absorbing and taking up vapors or odors. When the dasher has arrived at the bottom of the can 1, continued pressure on the handle 16 will force the can to the bottom of the tank 6 so that the water contained in the interspace of the bosses 2 and 7 will be forced out. By a quick withdrawal of the dasher 14, the consequent suction upon the boss 2 will lift the can 1 as far as permitted by the swinging hooks 11, the cold water returning and filling the interspace between the bosses 2 and 7. When the dasher is withdrawn so as to separate the dasher from the boss 2, the vacuum in the former will draw together any particles of impure air which may remain in the milk or cream and discharge them when the dasher is completely raised out of the milk or cream.

The relatively movable hooks 11 and 12 thus permit said mechanical reciprocation of the can 1 without any obstruction or interference or other difficulty, as these parts are entirely of metal and cannot swell or become foul as may be the case with the wooden ribs or guides E of my invention of said Patent 765,778.

Having described my invention, what I claim as new, and desire to secure by Letters Patent, is:

1. A device of the character described, comprising a cooling-receptacle, a cream-containing can within said cooling-receptacle, and loosely linked means therebetween for permitting a slight vertical reciprocation of the cream-containing can.

2. A device of the character described, comprising a cooling-receptacle, a cream-containing can within said receptacle, loosely-linked means for permitting a slight vertical reciprocation of said cream-containing can, and other loosely linked means connected between said receptacle and said can for retaining the can against lateral movement only.

Signed at Waterloo, Iowa, this 6th day of September, 1919.

GEORGE W. KENNEDY.